US009045615B2

(12) United States Patent
Austin et al.

(10) Patent No.: US 9,045,615 B2
(45) Date of Patent: Jun. 2, 2015

(54) METAL CARBOXYLATE ADDITIVES FOR THERMOPLASTICS

(75) Inventors: Jeremy Roland Austin, King of Prussia, PA (US); Herbert Shin-I Chao, Paoli, PA (US)

(73) Assignee: Fina Technology, Inc., Houston, TX (US)

( * ) Notice: Subject to any disclaimer, the term of this patent is extended or adjusted under 35 U.S.C. 154(b) by 340 days.

(21) Appl. No.: 13/216,398

(22) Filed: Aug. 24, 2011

(65) Prior Publication Data

US 2013/0053496 A1   Feb. 28, 2013

(51) Int. Cl.
| | |
|---|---|
| *C08K 5/098* | (2006.01) |
| *C08L 23/12* | (2006.01) |
| *C08L 23/04* | (2006.01) |
| *C08L 23/02* | (2006.01) |
| *C08K 5/00* | (2006.01) |

(52) U.S. Cl.
CPC ............... *C08K 5/0091* (2013.01); *C08K 5/098* (2013.01); *C08L 23/04* (2013.01)

(58) Field of Classification Search
CPC .... C08K 5/098; C08K 5/0083; C08K 5/0091; C08L 23/04; C08L 23/06; C08L 23/08; C08L 23/10; C08L 23/12; C08L 23/14
USPC .................................. 524/394–400, 582–587
See application file for complete search history.

(56) References Cited

U.S. PATENT DOCUMENTS

| | | | | |
|---|---|---|---|---|
| 3,207,739 | A | * | 9/1965 | Wales ........................... 524/396 |
| 3,322,739 | A | | 5/1967 | Hagemeyer, Jr. et al. |
| 3,367,926 | A | * | 2/1968 | Voeks .............................. 524/84 |
| 3,522,198 | A | * | 7/1970 | Ichikawa et al. ............... 524/490 |

(Continued)

FOREIGN PATENT DOCUMENTS

| | | | |
|---|---|---|---|
| CN | 1113501 A | | 12/1995 |
| CN | 1966563 A | * | 5/2007 |

(Continued)

OTHER PUBLICATIONS

CAPlus Abstract of JP 57-042752 (AN 1982:424893, May 1984, 1 page).*

(Continued)

*Primary Examiner* — Brieann R Fink
(74) *Attorney, Agent, or Firm* — RatnerPrestia (57) ABSTRACT

A thermoplastic composition includes a polyolefin having a polymeric backbone and, associated therewith, one or more ionic compounds having a central metal element and one or more carboxylic acid functional moieties. The thermoplastic composition may be, for example, polyethylene or polypropylene. A method of improving the mechanical properties of thermoplastics includes adding, to a thermoplastic composition having a polymeric backbone, an additive including one or more ionic compounds having a central metal element and one or more carboxylic acid functional moieties, wherein the additive is added to the thermoplastic composition at conditions suitable to associate the one or more ionic compounds to the polymeric backbone. The ionic compounds may be, for example, zinc cinnamate, zinc hydrocinnamate, zinc naphthoate, zinc naphthalene acetate, isophthalic acid zinc salt, and phthalic acid zinc salt, and their equivalents substituting calcium or magnesium instead of zinc as the central metal element, and mixtures thereof.

16 Claims, 6 Drawing Sheets

(56) References Cited

U.S. PATENT DOCUMENTS

| | | | |
|---|---|---|---|
| 3,522,223 A | 7/1970 | Taylor | |
| 3,591,538 A | 7/1971 | Smith | |
| 3,637,634 A * | 1/1972 | Marinaccio et al. | 524/396 |
| 3,823,122 A * | 7/1974 | Schuh et al. | 524/287 |
| 4,186,240 A * | 1/1980 | Matsuda et al. | 428/349 |
| 4,495,326 A * | 1/1985 | Donatelli et al. | 524/533 |
| 4,851,463 A * | 7/1989 | Opsahl et al. | 524/109 |
| 4,990,554 A | 2/1991 | Nomura | |
| 4,992,494 A * | 2/1991 | Odaira et al. | 524/100 |
| 5,030,682 A * | 7/1991 | Nomura et al. | 524/522 |
| 5,081,170 A | 1/1992 | Yagi et al. | |
| 5,202,363 A * | 4/1993 | Oberster et al. | 523/333 |
| 5,378,539 A | 1/1995 | Chen | |
| 5,508,347 A * | 4/1996 | Ohmae et al. | 525/74 |
| 6,365,689 B1 * | 4/2002 | Ushioda et al. | 526/160 |
| 6,645,290 B1 | 11/2003 | Barbour | |
| 6,756,446 B2 * | 6/2004 | Ding et al. | 525/191 |
| 6,914,094 B2 | 7/2005 | Ding | |
| 7,365,116 B2 * | 4/2008 | Chen | 524/300 |
| 2007/0004861 A1 * | 1/2007 | Cai et al. | 525/192 |

FOREIGN PATENT DOCUMENTS

| | | | |
|---|---|---|---|
| EP | 343109 A1 * | 11/1989 | |
| EP | 0 684 280 A1 | 11/1995 | |
| GB | 1 338 142 | 11/1973 | |
| GB | 2 204 048 A | 11/1988 | |
| GB | 2 332 678 A | 6/1999 | |
| JP | 53012946 A * | 2/1978 | |
| JP | 56034731 A * | 4/1981 | |
| JP | 57042752 A * | 3/1982 | |
| JP | 58098343 A * | 6/1983 | |
| JP | 2002-265725 A | 9/2002 | |

OTHER PUBLICATIONS

Derwent Abstract of JP 53-012946 (Acc-No. 1978-22448A, 1978).*
Human translation of JP 56034731 (Apr. 1981, 16 pages).*
Machine translated English equivalent of CN 1966563 (2013, 9 pages).*
JPO Abstract of JP 58098343 (Jun. 1983).*
Cray Valley Application Bulletin: "Augmenting Polyolefin Mechanical Properties using Ionic Monomers." pp. 1-3, (Jan. 1, 2010).
Sartomer Application Bulletin: "Combinatorial Effect of SMA and a Proprietary Processing Aid in Wood Plastic Composites to Improve Mechanical Performance." pp. 1-7, (Sep. 1, 2008).
International Search Report dated Dec. 5, 2012, from PCT International Application No. PCT/US2012/051271.
Chinese Office Action for Chinese Patent Application No. 201280041163.3 mailed Dec. 24, 2014 (with English translation).

* cited by examiner

METAL CARBOXYLATE ADDITIVES FOR THERMOPLASTICS

FIELD OF THE INVENTION

This invention relates to metal carboxylate additives for thermoplastics which impart improved mechanical properties, including, for example, heat distortion temperature, modulus, and tensile strength. More particularly, the invention relates to thermoplastics, such as polyolefins, which include additive compositions for imparting improved mechanical properties. Additionally, this invention relates to the methods for imparting improved mechanical properties to thermoplastics, the resulting enhanced thermoplastics and articles.

BACKGROUND OF THE INVENTION

In many industrial applications, formulated thermoplastic compositions require a balance of cost and performance. To that end, commodity materials such as polyethylene and polypropylene are attractive suitors from a cost standpoint, but are deficient in heat distortion temperature, modulus or tensile strength (herein referred to as mechanical properties). Classical efforts to improve the mechanical properties, such as glass reinforcement, will often result in deterioration of other beneficial properties. Additionally, known methods to improve the mechanical properties of thermoplastics often require substantial deviation in process operations and material requirements.

Polyolefins are useful in a wide variety of applications due to their intrinsic beneficial properties, including chemical stability, price point, and processability. Polyolefins, however, do not possess the thermal characteristics to compete against engineered thermoplastics. Some advances have been developed which overcome this deficiency to some degree, but generally the beneficial properties listed above are diminished. For example, the heat distortion temperature of polyolefins can be effectively improved by incorporation of high aspect ratio inorganic reinforcing additives, such as glass fibers, by crosslinking the substrate or by nucleation. Other desirable properties, however, are diminished by the inclusion of such additives.

Known methods for improving the mechanical properties of thermoplastics have focused on chemical modifications to the structure of the thermoplastic, changes to the crystallization characteristics of the thermoplastic, or crosslinking the thermoplastic composition, all of which require additional processes and equipment which can increase the operational costs for production of mechanically robust thermoplastics. For example, U.S. Pat. No. 4,990,554 describes a polyolefin composition comprising 75 to 97% polyolefin, and 25 to 3% by weight of a fibrous inorganic filler. This process theorizes that the underlining principle governing a material's heat distortion temperature is the ability to retain flexural modulus at elevated temperature. Consequently, high modulus inorganic fillers, such as glass or mineral, are added to the thermoplastic to impart an internal framework for resisting an applied load. The resulting compositions demonstrated an improvement in thermal deformation temperature, among other properties. This mechanism relies on the inorganic filler resisting conformal deformation in response to the applied load, or reducing the mobility of the polymeric chains at the organic-inorganic interface. Such reinforced thermoplastics may offer the desired mechanical properties, but they require additional materials which can increase the cost of production. As mentioned above, these methods also often reduce the native properties of the thermoplastics, such as flowability, processability, ease of conversion, and specific gravity.

U.S. Pat. No. 6,914,094 describes a polyolefin composition containing graft modified polyolefin-metal salt. The compositions were found to demonstrate improvements in both modulus and heat distortion temperature. The metal salt was introduced to the graft modified composition to neutralize the acid, and potentially form an ionomeric structure similar to a product sold by DuPont under the tradename Surlyn®. The metal salt is introduced to form an ionomeric structure that could impart inter- and intra-molecular forces to improve the mechanical properties of the thermoplastic. Accordingly, the improvement in the mechanical properties is derived by the presence of the ionomer. The inclusion of metal salts by this process results in a structural change in the modified thermoplastics, which is known to have an effect on the inherent properties associated with the host polymer. As a result, while certain mechanical properties are improved by this process, other desirable properties are sacrificed or lost.

A further known method to improve the mechanical properties of thermoplastics includes cross-linking. Crosslinked polyolefins are not a new topic of research, in fact there have been numerous investigations focusing on flame retardant compositions. In order to improve the thermal resistance, the polyolefin resin can be chemically crosslinked. For example, U.S. Pat. No. 5,378,539 describes a crosslinked composition that may contain an olefin resin that includes an olefin, metal hydroxide, coupling agents, a peroxide and a polyfunctional metal salt. The metal salt is believed to participate in the cross-linking reaction that is initiated by the presence of peroxide. The finished products have the improved flame retardant properties, and a balance of mechanical properties such as flowability and ease of conversion. However, the process is cumbersome and difficult to control in conventional compounding equipment. Additionally, the final composition is deemed a thermoset and is not reprocessible, a desirable characteristic of polyolefins.

Another method known in the art to improve mechanical properties in thermoplastics, such as polypropylene, is the use of metal salts as nucleation agents. For example, U.S. Pat. No. 6,645,290 describes a composition consisting of nucleation agents potentially comprising calcium, sodium or aluminum salts that impart improvements in crystallization kinetics. The compositions were found to have an improved flexural modulus, which is known to correlate to an improved heat distortion temperature. Nucleation is an effective tool for improving polypropylene properties, as it has an inherently slow crystallization rate. One deficiency of this technology is that is that is not effective with more rapid crystallizing polyolefins, such as the polyethylene family. Additionally, the use of metal salts as nucleators, and the resulting nucleation of the thermoplastic, requires additional materials which can increase the cost of production.

SUMMARY OF THE INVENTION

It has now been discovered that additives containing one or more metal salts, such as metal carboxylates, impart improved mechanical properties to thermoplastics. For example, particular additives of the present invention impart improved mechanical properties, such as improved heat distortion temperature, modulus, and tensile strength, to thermoplastics such as polyolefins. It will be understood that while some properties of the thermoplastics may be reduced, the additives according to the present invention acceptably retained some mechanical properties while greatly improving key mechanical properties, such as the heat distortion/deflection temperature, of the underlying thermoplastics. Accordingly, as would be readily appreciated by one having ordinary skill in the art, the additives may be selected to achieve a range of desirable characteristics or mechanical properties of the resulting thermoplastic. An enhanced thermoplastic material containing the additive may be formulated to achieve improved mechanical properties compared to when the additive is not present. The enhanced thermoplastic material containing the additive, such as an enhanced polyolefin, may be utilized to manufacture various articles using a myriad of process technologies. The presence of such an additive in an enhanced thermoplastic material improves the mechanical properties of the thermoplastic while retaining certain desirable characteristics inherent to the native polyolefin, such as reprocessability.

Accordingly, the thermoplastic compositions containing metal salts are a favorable replacement for traditional thermoplastics which lack the robust mechanical properties of the present invention. Without being held to any theory, the improved mechanical properties imparted by the metal salts are thought to be enabled by specific tailoring of the ligands associated with the metal centers. The use of such metal salts, which have a dispersible and interactive ligand and ionic association characteristics, were surprisingly found to physically immobilize the polymer chains of thermoplastics. This was surprisingly found to impart mechanical properties similar to, or better than, those of crosslinked, reinforced, or nucleated thermoplastics. That is, the additives, compositions, and methods of the present invention were found to impart improved mechanical properties to thermoplastics, without the limitations, detractions, or additional costs associated with existing processes known in the art. The additives and methods of the present invention could be applied to a range of thermoplastics, specifically polyolefins such as polyethylene and polypropylene. The compositions of the present invention were found to have improved mechanical properties, while still retaining other desirable properties such as reprocessability. Articles produced by the compositions of the present invention were found to have improved mechanical properties, without requiring further treatment or additional processing steps.

According to a first embodiment, the present invention relates to an additive for imparting improved mechanical properties to thermoplastics, the additive comprising one or more ionic compounds comprising a central metal element and one or more carboxylic acid functional moieties. Generally, ionic compounds having one, two, or more carboxylic acid functional moieties were suitably employed for this purpose. Ionic compounds containing aromatic ring-containing carboxylic acids, such as those containing one, two, or three aromatic rings, including fused aromatic rings, were also found to impart the improved mechanical properties desirable of thermoplastics. A number of metal salts, such as metal carboxylates, are functional to improve the mechanical properties of polyolefins. These include the carboxylates of calcium, magnesium, and zinc. For example, zinc dimethacrylate, zinc diacrylate, zinc isobutyrate, zinc propionate, zinc acetate, zinc isovalerate, pivalic acid zinc salt, zinc stearate, maleic acid zinc salt, adipic acid zinc salt, zinc phenylacetate, zinc cinnamate, zinc hydrocinnamate, zinc naphthoate, zinc naphthalene acetate, isophthalic acid zinc salt, and phthalic acid zinc salt, and their equivalents substituting calcium or magnesium instead of zinc as the metal center, and mixtures thereof, may be used as metal carboxylates to improve the mechanical properties of polyolefins. Additionally, the metal salts may be metal carboxylates of zinc (Zn), cobalt (Co), tin (Sn), cerium (Ce), lanthanum (La), aluminum (Al), vanadium (V), manganese (Mn), copper (Cu), nickel (Ni), iron (Fe), titanium (Ti), zirconium (Zr), chromium (Cr), scandium (Sc), calcium (Ca), magnesium (Mg), strontium (Sr), barium (Ba), and bismuth (Bi). These carboxylates can be readily blended into a thermoplastic composition. Specifically, any metal carboxylates having one or more carboxylic functional moieties and/or groups may be employed in the present invention. While a number of metal carboxylates, or salts thereof, have been found to work for this purpose, zinc cinnamate, zinc hydrocinnamate, zinc naphthalene acetate, and zinc naphthoate are preferred, for example, for certain polyolefins.

In another embodiment, the present invention relates to a thermoplastic composition with improved mechanical properties. The thermoplastic composition comprises a polyolefin having a polymeric backbone and, associated therewith, one or more ionic compounds comprising a central metal element and one or more carboxylic acid functional moieties. In at least one embodiment of the present invention, the polymeric backbone is aliphatic. In other embodiments, the polymeric backbone may contain aliphatic as well as aromatic repeating units. The polyolefin comprising a polymeric backbone may be, for example, polyethylene (PE) or polypropylene (PP).

In an exemplary embodiment, the present invention relates to a polyethylene composition with improved mechanical properties. The polyethylene composition has a polymeric backbone of one or more repeating ethylene units and, associated therewith, one or more ionic compounds comprising a central zinc element and one or more carboxylic acid functional moieties. The ionic compounds may have one, two, or more carboxylic acid functional moieties, including aromatic ring-containing carboxylic acid moieties. Particularly, zinc cinnamate, zinc hydrocinnamate, zinc naphthalene acetate, and zinc naphthoate may be employed for improved thermoplastics according to this embodiment of the invention.

In a further embodiment, the present invention is a method of improving the mechanical properties of a thermoplastic, the method comprising adding, to a thermoplastic composition having a polymeric backbone, an additive comprising one or more ionic compounds comprising a central metal element and one or more carboxylic acid functional moieties, wherein the additive is added and mixed with the thermoplastic composition at conditions suitable to associate the one or more ionic compounds with the polymeric backbone. The thermoplastic may be a polyolefin such as, for example, polyethylene (PE) or polypropylene (PP).

In yet another embodiment, the present invention relates to a thermoplastic article having improved mechanical properties, the article comprising a polyolefin having a polymeric backbone and, associated therewith, one or more ionic compounds comprising a central metal element and one or more carboxylic acid functional moieties. The thermoplastic may be a polyolefin such as, for example, polyethylene (PE) or polypropylene (PP).

BRIEF DESCRIPTION OF THE FIGURES

The advantageous properties of this invention can be observed by reference to the following non-limiting figures, in which.

DETAILED DESCRIPTION OF THE INVENTION

According to one or more embodiments, the present invention relates to a thermoplastic composition with improved mechanical properties. The thermoplastic composition comprises a polyolefin comprising a polymeric backbone and, associated therewith, one or more ionic compounds comprising a central metal element and one or more carboxylic acid functional moieties. The terms "polymer" and "resin" are to be interpreted in the present invention as having the same meaning, namely a naturally occurring or synthetic compound consisting of large molecules made up of a linked series of repeated simple molecules obtained by, for example, a polymerization process. In at least one embodiment of the present invention, the polymeric backbone is aliphatic. In other embodiments, the polymeric backbone may contain aliphatic as well as aromatic repeating units.

The polyolefin comprising a polymeric backbone can represent, for example, the polyethylene family (LLDPE, LDPE, HDPE, etc.), polypropylene, and copolymers, among others. The term "polyolefin," as used herein, is meant to include the class or group of thermoplastic polymers derived from simple olefins, including polyethylene, polypropylene, polybutenes, polystyrenes, ethylene-propylene rubber, polybutene-1, polyisobutylene, cyclopolyolefins, polyisoprene and poly-α-olefins. The term also includes homopolymers, copolymers, grafted copolymers, and the like.

The structure of the metal salt has been found to impact the mechanical properties of polyolefins. Without being held to the theory, it is believed that the ligands associated with the metal center of the carboxylate promote dispersion within the host polymer. Metal carboxylates which have metal center structures with favorable ligand configurations, such as those which do not detract from the associative nature of the metal ion, are found to improve the mechanical properties of thermoplastics more than others. It will be understood that the additives described herein impact the mechanical properties of thermoplastics, particularly polyolefins. While some properties may be reduced from the native thermoplastic, the additives according to the present invention acceptably retained some mechanical properties while greatly improving key mechanical properties, such as the heat distortion/deflection temperature, of the underlying thermoplastics. Accordingly, as would be readily appreciated by one having ordinary skill in the art, the additives may be selected to achieve a range of desirable characteristics or mechanical properties of the resulting thermoplastic.

A number of metal salts are functional to improve the mechanical properties of polyolefins, including but not limited to the carboxylates or acids thereof of calcium, magnesium, and zinc. Generally, functional metal salts may be ionic compounds comprising a central metal element and one or more carboxylic acid functional moieties. Generally, ionic compounds having one, two, or more carboxylic acid functional moieties were suitably employed for this purpose. Ionic compounds containing aromatic ring-containing carboxylic acids, such as those containing one, two, or three aromatic rings, including fused aromatic rings, were also found to impart the improved mechanical properties desirable of thermoplastics. For example, zinc dimethacrylate, zinc diacrylate, zinc isobutyrate, zinc propionate, zinc acetate, zinc isovalerate, pivalic acid zinc salt, zinc stearate, maleic acid zinc salt, adipic acid zinc salt, zinc phenylacetate, zinc cinnamate, zinc hydrocinnamate, zinc naphthoate (or zinc salt of naphthoic acid), zinc naphthalene acetate (or the zinc salt of 1-naphthalene acetic acid), isophthalic acid zinc salt, and phthalic acid zinc salt, and their equivalents substituting calcium or magnesium instead of zinc as the metal center, and mixtures thereof, may be used as metal salts to improve the mechanical properties of polyolefins. While a number of metal carboxylates, or salts thereof, have been found to work for this purpose, zinc cinnamate, zinc hydrocinnamate, zinc naphthalene acetate, and zinc naphthoate are preferred, for example, for certain polyolefins. Polyolefins which include one or more of these metal carboxylates have shown improved heat distortion temperature measurements over the native polyolefin and the polyolefin with zinc oxides.

In one embodiment, a polyolefin composition is improved by incorporation of a metal-centered carboxylate salt having the below Formula I:

FORMULA I wherein R1 and R2 are the same or different. M is a metal selected from the group consisting of calcium, magnesium, and zinc. R1 and R2 represent saturated or unsaturated hydrocarbyl groups of about 6 to about 36 carbon atoms and containing at least one aryl group which may be a substituted or unsubstituted aryl group. The carboxylic salt may be a salt of a carboxylic acid-containing compound selected, for example, from the group consisting of benzoic acid, 1-naphthoic acid, 2-naphthoic acid, 9-anthracenecarboxylic acid, 3-phenanthrenecarboxylic acid, 4-phenanthrenecarboxylic acid, 9-phenanthrenecarboxylic acid, and 2-phenanthrenecarboxylic acid, with either a substituted or unsubstituted aromatic ring. In addition, the carboxylic salt may be a salt of a carboxylic acid-containing compound selected, for example, from the group consisting of cinnamic acid, hydrocinnamic acid, and phenylacetic acid, with either a substituted or unsubstituted aromatic ring. As stated above, it may be preferred to utilize a metal carboxylate, or salt thereof, which has at least one aromatic moiety.

Without being held to the theory, it has now been determined that tailoring the structure of the ligands associated with the metal center of the additive enables the improved mechanical property changes of the thermoplastics. Having a dispersible and interactive ligand with ionic association characteristics is believed to physically immobilize the polymer chains of the thermoplastic, and thereby give it improved mechanical properties. These improved mechanical properties are similar to, or better than, those attained by crosslinking, reinforcing, or nucleating polyolefins by the methods described in the art, yet can be achieved without the detractions listed above for each of the known methods.

Additionally, another advantage over the known prior art techniques is the retention of the intrinsic and desirable properties of the host polymer. For instance, incorporation of glass fiber can reduce flow (e.g., processability), increase specific gravity (part weight) and reduce the impact properties. Crosslinking a polyolefin may reduce or eliminate the ability to rework or recycle the thermoplastic material. Crosslinking is also known to be a cumbersome process. The nucleation methods of the prior art influences the crystalline nature of the polymer, which is the source of desirable chemical and dimensional stability, as well as the barrier properties. Additionally, conventional nucleators are designed to improve polypropylene and are not suitably employed for polyethylene. The additives and methods of the present invention, however, are non-discriminatory between polyethylene and polypropylene and can be suitably employed for both types of polyolefins, among others.

In a preferred embodiment, the present invention is a polyethylene thermoplastic composition having improved mechanical properties, the composition comprising a polymeric backbone of one or more repeating ethylene units, associated therewith, a zinc-centered carboxylate salt having the below Formula II:

FORMULA II wherein R1 and R2 are the same or different. R1 and R2 represent saturated or unsaturated hydrocarbyl groups of about 6 to about 36 carbon atoms and containing at least one aryl group which may be a substituted or unsubstituted aryl group. The carboxylic salt may be a salt of a carboxylic acid-containing compound selected, for example, from the group consisting of benzoic acid, 1-naphthoic acid, 2-naphthoic acid, 9-anthracenecarboxylic acid, 3-phenanthrenecarboxylic acid, 4-phenanthrenecarboxylic acid, 9-phenanthrenecarboxylic acid, and 2-phenanthrenecarboxylic acid, with or without more substituents on the aromatic rings. In addition, the carboxylic salt may be a salt of a carboxylic acid-containing compound selected, for example, from the group consisting of cinnamic acid, hydrocinnamic acid, and phenylacetic acid, with or without more substituents on the aromatic ring. As stated above, it may be preferred to utilize a metal carboxylate, or salt thereof, which has at least one aromatic moiety. For example, in a preferred embodiment, the zinc-centered metal carboxylate salt may be a salt of a carboxylic acid-containing compound from the group consisting of zinc cinnamate, zinc hydrocinnamate, zinc naphthalene acetate, and zinc naphthoate, and mixtures thereof.

In some embodiments of the present invention, the invention relates to an article formed from a polyolefin that includes a dispersed metal salt. In one embodiment, the metal salt is present in a range of about 0.1 to about 10% by weight, while the remainder comprises of a polyolefin. The amount of metal salt may range from about 0.1 to about 10%, more specifically from about 0.5 to about 5%, and further more specifically to about 1 to about 2.5% by weight of the polymer blend. The composition and article may further comprise a number of other additives, fillers, stabilizers, colorants, and the like, as would be known to one having ordinary skill in the art. The article may be formed by any process, including one or more processes known in the art such as by extrusion, injection molding, casting, or pressing, among others.

The improved thermoplastics of the present invention may be formed by adding the additive comprising one or more ionic compounds comprising a central metal element and one or more carboxylic acid functional moieties to a thermoplastic composition comprising a polymeric backbone. The additive may be added and mixed with the thermoplastic composition at conditions suitable to associate the one or more ionic compounds to the polymeric backbone. For example, the improved thermoplastic may be processed in a twin screw extruder with the polymer added as a powder or in pellet form. As stated above, a number of additives known in the art may be added to the blend such as, for example, mineral oil, tackifiers, antioxidants, fillers, colorants, and stabilizers. A constant temperature profile may be used for the process. Formulations based on either polyethylene or polypropylene may suitably be carried out, for example, at 180° C. and 210° C., respectively. The metal salt additive may be added to the formulation in a number of different ways, such as by drop loading or other methods known in the art, either in solution or as a dry material.

EXAMPLES

The advantageous properties of this invention can be observed by reference to the following examples, which illustrate but do not limit the invention.

The additives of the present invention, and the resulting improved thermoplastics, were tested on various polyolefins. Specifically, the additives were tested on a high-density polyethylene (HDPE) resin sold under the name "HD 6719 Series" by ExxonMobil Chemical Company of Houston, Tex. This product customarily has a melt index of 19 g/10 min and a density of 0.952 g/cm³. The additives were also tested on a polypropylene homopolymer sold under the name "HIVAL® 2420" by Nexeo Solutions, LLC of Dublin, Ohio. This product customarily has a melt index of 20 g/10 min and a density of 0.903 g/cm³. The ionic compounds tested were obtained from Cray Valley USA, LLC of Exton, Pa. A small amount of an antioxidant was also employed, such as that sold under the name "Irganox 1010" by BASF of Ludwigshafen, Germany.

All formulations were dry blended without pre-drying and carried out on a 20 mm co-rotating fully intermeshing twin screw extruder. The extruder was equipped with a single strand die, which was cooled in a water trough prior to granulating. A constant temperature profile was used from feedthroat to die. Formulations based on either polyethylene or polypropylene were carried out at 180° C. and 210° C., respectively. Loading levels ranged from about 1 to about 2% by weight of the additive to the thermoplastic composition, with 0.1% comprising an antioxidant. Baseline thermoplastic compositions, containing no amount of the additive, were completed for each polyolefin system as well.

The samples were tested for a number of mechanical properties, including yield strength (YS; measured in MPa), tensile strength (TS; measured in MPa), elastic modulus (E; measured in GPa), elongation (measured as a percentage %), and heat distortion/deflection temperature (HDT; measured in ° C.), using known ASTM standards. The samples are unannealed and tested at 0.45 MPa load. Heat distortion temperature measurements were carried out on a TA Instruments model 2980 Dynamic Mechanical Analyzer (DMA) and performed using a dual cantilevered fixture. The HDT method prescribed a 2° C. per minute ramp from room temperature to 10° C. below the melt transition of the polymer. Given that DMA samples are smaller than prescribed by ASTM D-648, the strain and deflection were normalized to reflect an equivalency.

Example 1

As a first example, a simple test was performed using two zinc-centered carboxylate salt additives to impart improved mechanical properties to a high-density polyethylene. The loading amounts of zinc 1-naphthoate and zinc 1-napththalene acetate were varied from about 1% to about 2% to measure the impact on the heat distortion temperature of the high-density polyethylene. Repetitive samples were tested for reproducibility. As known by one having ordinary skill in the art, the ingredients may be adjusted to achieve specifically desired properties. For example, the amount of the additive may be varied to achieve a thermoplastic having the desired mechanical properties and intrinsically beneficial characteristics.

As seen in Table 1 above, both the zinc 1-napththoate and the zinc 1-naphthalene acetate additive imparted improved mechanical properties, specifically improved heat distortion temperature, to the high-density polyethylene. The heat distortion temperature of the control native high-density polyethylene ranged from 39.69° C. to 40.09° C., with an average temperature of 39.84° C. Even just 1% of the zinc-centered carboxylate additive improved the heat distortion temperature of the high-density polyethylene, as can be seen above in Table 1. A further enhanced heat distortion temperature was identified when 2% of zinc 1-napththoate is employed with the high-density polyethylene.

Example 2

As a further example, a number of zinc-centered carboxylate salt additives were tested to impart improved mechanical properties to a high-density polyethylene. The loading amounts of these additives were again varied from about 1% to about 2% to measure the impact on the mechanical properties of the high-density polyethylene. A native high-density polyethylene sample containing zero amount of additive was used as a control sample. Additionally, a sample having zinc oxide as the additive was tested, for comparative purposes. As known by one having ordinary skilled in the art, the ingredients may be adjusted to achieve specifically desired properties. For example, the amount of the additive may be varied to achieve a thermoplastic having the desired mechanical properties and intrinsically beneficial characteristics.

TABLE 2

Effect of zinc-centered carboxylate additives on the mechanical properties of HDPE.

| Sample | % Additive | YS, MPa | % Change | TS, MPa | % Change |
|---|---|---|---|---|---|
| Control HDPE | 0% | 27.476 | — | 18.892 | — |
| Zinc dimethacrylate | 1% | 25.407 | −7.53% | 16.616 | −12.04% |
|  | 2% | 26.304 | −4.27% | 17.133 | −9.31% |
| Zinc diacrylate | 1% | 27.769 | 1.07% | 18.271 | −3.28% |
|  | 2% | 28.506 | 3.75% | 18.478 | −2.19% |
| Zinc Isobutyrate | 1% | 26.345 | −4.12% | 17.202 | −8.94% |
|  | 2% | 26.383 | −3.98% | 17.306 | −8.39% |
| Zinc propionate | 1% | 26.245 | −4.48% | 17.151 | −9.22% |
|  | 2% | 25.911 | −5.70% | 16.927 | −10.40% |
| Zinc acetate | 1% | 26.586 | −3.24% | 17.375 | −8.03% |
|  | 2% | 26.517 | −3.49% | 17.444 | −7.66% |
| Zinc isovalerate | 1% | 26.213 | −4.60% | 15.901 | −15.83% |
|  | 2% | 26.617 | −3.12% | 16.375 | −13.32% |
| Pivalic acid zinc salt | 1% | 26.020 | −5.30% | 17.371 | −8.05% |
|  | 2% | 25.265 | −8.04% | 14.747 | −21.94% |

TABLE 1

Heat Distortion Temperature (° C.) - HDPE

| Sample | Loading Level | \multicolumn{6}{c}{Heat Distortion Temperature (° C.) individual results} | Average | Std Dev |
|---|---|---|---|---|---|---|---|---|---|
|  |  | 1 | 2 | 3 | 4 | 5 | 6 |  |  |
| HDPE |  | 40.09 | 39.69 | 39.75 | — | — | — | 39.84 | 0.21 |
| Zinc 1-naphthoate | 1% | 50.01 | 49.82 | 49.47 | 49.78 | 47.33 | 49.81 | 49.37 | 1.01 |
|  | 2% | 51.03 | 52.25 | 49.08 | 49.90 | 48.07 | 51.95 | 50.38 | 1.65 |
| Zinc 1-naphthalene acetate | 1% | 44.29 | 43.03 | 43.70 | 43.19 | 45.34 | 43.43 | 43.83 | 0.86 |
|  | 2% | 42.20 | 41.18 | 42.18 | 41.98 | 42.26 | 43.31 | 42.18 | 0.68 |

TABLE 2-continued

Effect of zinc-centered carboxylate additives on the mechanical properties of HDPE.

| Sample | % Additive | YS, MPa | % Change | TS, MPa | % Change |
|---|---|---|---|---|---|
| Zinc stearate | 1% | 25.932 | −5.62% | 15.628 | −17.27% |
| | 2% | 26.004 | −5.36% | 15.065 | −20.26% |
| Maleic acid zinc salt | 1% | 25.473 | −7.29% | 16.582 | −12.23% |
| | 2% | 25.924 | −5.65% | 14.548 | −22.99% |
| Adipic acid zinc salt | 1% | 27.993 | 1.88% | 14.996 | −20.62% |
| | 2% | 26.028 | −5.27% | 12.824 | −32.12% |
| Zinc phenylacetate | 1% | 25.062 | −8.78% | 14.858 | −21.35% |
| | 2% | 24.997 | −9.02% | 14.303 | −24.29% |
| Zinc cinnamate | 1% | 25.700 | −6.46% | 14.265 | −24.49% |
| | 2% | 25.428 | −7.45% | 13.858 | −26.64% |
| Zinc hydrocinnamate | 1% | 25.486 | −7.24% | 14.331 | −24.14% |
| | 2% | 25.914 | −5.68% | 13.617 | −27.92% |
| Zinc 1-naphthoate | 1% | 27.468 | −0.03% | 14.085 | −25.44% |
| | 2% | 27.416 | −0.22% | 14.300 | −24.31% |
| Zinc 1-naphthalene Acetate | 1% | 28.315 | 3.06% | 14.781 | −21.76% |
| | 2% | 28.344 | 3.16% | 14.496 | −23.27% |
| Zinc oxide | 1% | 23.247 | −15.39% | 15.318 | −18.92% |
| | 2% | 23.584 | −14.16% | 15.601 | −17.42% |

TABLE 3

Effect of zinc-centered carboxylate additives on the mechanical properties of HDPE.

| Sample | % Additive | E, GPa | % Change | Elong, % | % Change |
|---|---|---|---|---|---|
| Control HDPE | 0% | 0.316 | — | 24.882 | — |
| Zinc dimethacrylate | 1% | 0.224 | −29.28% | 24.872 | −0.04% |
| | 2% | 0.311 | −1.53% | 22.190 | −10.82% |
| Zinc diacrylate | 1% | 0.321 | 1.57% | 22.183 | −10.85% |
| | 2% | 0.328 | 3.93% | 21.144 | −15.02% |
| Zinc Isobutyrate | 1% | 0.335 | 6.00% | 25.009 | 0.51% |
| | 2% | 0.342 | 8.16% | 22.270 | −10.50% |
| Zinc propionate | 1% | 0.326 | 3.01% | 23.174 | −6.86% |
| | 2% | 0.316 | 0.14% | 26.963 | 8.36% |
| Zinc acetate | 1% | 0.346 | 9.51% | 23.490 | −5.59% |
| | 2% | 0.340 | 7.71% | 28.245 | 13.52% |
| Zinc isovalerate | 1% | 0.261 | −17.26% | 22.088 | −11.23% |
| | 2% | 0.288 | −8.91% | 20.417 | −17.94% |
| Pivalic acid zinc salt | 1% | 0.272 | −13.81% | 31.057 | 24.82% |
| | 2% | 0.248 | −21.58% | 20.435 | −17.87% |
| Zinc stearate | 1% | 0.260 | −17.58% | 19.934 | −19.89% |
| | 2% | 0.309 | −2.37% | 19.287 | −22.49% |
| Maleic acid zinc salt | 1% | 0.293 | −7.15% | 20.024 | −19.52% |
| | 2% | 0.289 | −8.48% | 21.627 | −13.08% |
| Adipic acid zinc salt | 1% | 0.298 | −5.80% | 18.981 | −23.72% |
| | 2% | 0.264 | −16.35% | 19.649 | −21.03% |
| Zinc phenylacetate | 1% | 0.291 | −7.83% | 20.051 | −19.42% |
| | 2% | 0.310 | −1.83% | 19.502 | −21.62% |
| Zinc cinnamate | 1% | 0.308 | −2.63% | 21.614 | −13.13% |
| | 2% | 0.301 | −4.66% | 20.334 | −18.28% |
| Zinc hydrocinnamate | 1% | 0.310 | −1.78% | 19.188 | −22.88% |
| | 2% | 0.296 | −6.40% | 18.876 | −24.14% |
| Zinc 1-naphthoate | 1% | 0.261 | −17.42% | 18.259 | −26.62% |
| | 2% | 0.254 | −20% | 19.612 | −21.18% |
| Zinc 1-naphthalene Acetate | 1% | 0.254 | −19.56% | 20.774 | −16.51% |
| | 2% | 0.286 | −9.63% | 20.889 | −16.05% |
| Zinc oxide | 1% | 0.283 | −10.45% | 17.575 | −29.37% |
| | 2% | 0.277 | −12.31% | 17.617 | −29.20% |

TABLE 4

Effect of zinc-centered carboxylate additives on the mechanical properties of HDPE.

| Sample | % Additive | HDT, °C | % Change |
|---|---|---|---|
| Control HDPE | 0% | 39.844 | — |
| Zinc dimethacrylate | 1% | 41.444 | 4.02% |
| | 2% | 41.026 | 2.97% |
| Zinc diacrylate | 1% | 42.103 | 5.67% |
| | 2% | 42.098 | 5.66% |
| Zinc Isobutyrate | 1% | 39.808 | −0.09% |
| | 2% | 42.045 | 5.52% |
| Zinc propionate | 1% | 40.228 | 0.96% |
| | 2% | 44.591 | 11.92% |
| Zinc acetate | 1% | 42.083 | 5.62% |
| | 2% | 40.274 | 1.08% |
| Zinc isovalerate | 1% | 44.116 | 10.72% |
| | 2% | 44.627 | 12.00% |
| Pivalic acid zinc salt | 1% | 42.607 | 6.94% |
| | 2% | 40.984 | 2.86% |
| Zinc stearate | 1% | 44.352 | 11.31% |
| | 2% | 41.117 | 3.20% |
| Maleic acid zinc salt | 1% | 42.656 | 7.06% |
| | 2% | 40.934 | 2.74% |
| Adipic acid zinc salt | 1% | 42.464 | 6.58% |
| | 2% | 41.452 | 4.04% |
| Zinc phenylacetate | 1% | 44.074 | 10.62% |
| | 2% | 42.904 | 7.68% |
| Zinc cinnamate | 1% | 42.142 | 5.77% |
| | 2% | 46.758 | 17.35% |
| Zinc hydrocinnamate | 1% | 45.996 | 15.44% |
| | 2% | 45.347 | 13.81% |
| Zinc 1-naphthoate | 1% | 49.370 | 23.91% |
| | 2% | 50.380 | 26.44% |
| Zinc 1-naphthalene Acetate | 1% | 43.833 | 10.01% |
| | 2% | 50.881 | 27.70% |
| Zinc oxide | 1% | 45.003 | 12.95% |
| | 2% | 43.946 | 10.30% |

As can be seen by Tables 2, 3, and 4 above, the zinc-centered carboxylate salt additives affected the mechanical properties of the high-density polyethylene. While all of the zinc-centered carboxylate salt additives impacted the mechanical properties of the high-density polyethylene, some additives were particularly useful for this purpose. For example, ionic compounds having one, two, or more carboxylic acid functional moieties were suitably employed for this purpose. Aromatic ring-containing carboxylic acids, however, such as those containing one, two, or three aromatic rings, were found to improve the mechanical properties of the HDPE to a greater degree. These include, but are not limited to, zinc cinnamate, zinc hydrocinnamate, zinc 1-naphthalene acetate, and zinc 1-naphthoate.

The results of the mechanical properties testing for the samples according to this example are shown graphically in FIGS. 1a-1f. As can be seen in the Figures and in the Tables above, the additives according to the present invention imparted improved mechanical properties to the underlying thermoplastics. Some additives produced thermoplastics which had reduced, yet acceptable, measurements for certain mechanical properties such as yield strength and tensile strength. The additives according to the present invention, however, acceptably retained or improved the heat distortion/deflection temperature properties of the underlying thermoplastics. Of particular note, aromatic ring-containing carboxylic acids, such as those containing one, two, or three aromatic rings, were found to improve the mechanical properties of the HDPE to a greater degree. Specifically, zinc cinnamate, zinc hydrocinnamate, zinc 1-naphthalene acetate, and zinc 1-naphthoate were found to retain or improve the mechanical properties of the underlying polyolefin more so than other additives. Additionally, the additives of the present invention allow the underlying thermoplastic to retain its intrinsic beneficial properties, including chemical stability and processability. Furthermore, as would be readily appreciated by one having ordinary skill in the art, the additives may be selected to achieve any desirable characteristic or mechanical property of the resulting thermoplastic.

Example 3

As discussed above, a number of zinc-centered carboxylate salt additives were tested to impart improved mechanical properties to a high-density polyethylene. Some of these additives were found to impart greater mechanical properties to the thermoplastic polymer than others. For example, zinc 1-naphthoate and zinc 1-naphthalene acetate were found to impart greater mechanical properties to the HDPE than other zinc-centered carboxylate salt additives. For comparison, a test was performed to substitute the metal at the center of the carboxylate salt additives. In various samples, zinc was substituted with magnesium or calcium to form magnesium naphthoate (or naphthoic) and magnesium naphthalene acetate, and calcium naphthoate (or naphthoic) and calcium naphthalene acetate, respectively. The loading amounts of these additives were again varied from about 1% to about 2% to measure the impact on the mechanical properties of the high-density polyethylene. A native high-density polyethylene sample containing zero amount of additive was again used as a control sample.

TABLE 5

Effect of various metal-centered carboxylate additives on HDPE.

| Sample | Additive % | YS, MPa | % Change | TS, MPa | % Change |
|---|---|---|---|---|---|
| Control HDPE | 0% | 27.48 | — | 18.89 | — |
| Zinc 1-naphthoate | 1% | 27.47 | 0.0% | 14.09 | −25.4% |
| | 2% | 27.42 | −0.2% | 14.30 | −24.3% |
| Calcium 1-naphthoate | 1% | 25.69 | −6.5% | 15.89 | −15.9% |
| | 2% | 26.31 | −4.2% | 16.20 | −14.2% |
| Magnesium 1-naphthoate | 1% | 25.51 | −7.2% | 13.10 | −30.7% |
| | 2% | 25.86 | −5.9% | 14.48 | −23.4% |
| Zinc 1-naphthalene Acetate | 1% | 28.32 | 3.1% | 14.78 | −21.8% |
| | 2% | 28.34 | 3.2% | 14.50 | −23.3% |
| Calcium 1-naphthalene Acetate | 1% | 26.89 | −2.1% | 15.80 | −16.4% |
| | 2% | 25.92 | −5.7% | 14.79 | −21.7% |
| Magnesium 1-naphthalene Acetate | 1% | 26.89 | −2.1% | 13.44 | −28.8% |
| | 2% | 27.23 | −0.9% | 13.79 | −27.0% |

TABLE 6

Effect of various metal-centered carboxylate additives on HDPE.

| Sample | Additive % | E, GPa | % Change | Elong, % | % Change |
|---|---|---|---|---|---|
| Control HDPE | 0% | 0.316 | — | 24.9 | — |
| Zinc 1-naphthoate | 1% | 0.261 | −17.4% | 18.3 | −26.6% |
| | 2% | 0.254 | −19.6% | 19.6 | −21.2% |
| Calcium 1-naphthoate | 1% | 0.229 | −27.6% | 21.9 | −12.1% |
| | 2% | 0.240 | −23.9% | 21.7 | −12.7% |
| Magnesium 1-naphthoate | 1% | 0.241 | −23.9% | 21.0 | −15.7% |
| | 2% | 0.305 | −3.5% | 20.8 | −16.5% |
| Zinc 1-naphthalene Acetate | 1% | 0.254 | −19.6% | 20.8 | −16.5% |
| | 2% | 0.286 | −9.6% | 20.9 | −16.0% |
| Calcium 1-naphthalene Acetate | 1% | 0.254 | −19.8% | 20.3 | −18.3% |
| | 2% | 0.276 | −12.6% | 22.1 | −11.3% |
| Magnesium 1-naphthalene Acetate | 1% | 0.288 | −9.0% | 18.7 | −24.8% |
| | 2% | 0.324 | 2.5% | 21.1 | −15.3% |

TABLE 7

Effect of various metal-centered carboxylate additives on HDPE.

| Sample | Additive % | HDT, °C. | % Change |
|---|---|---|---|
| Control HDPE | 0% | 39.84 | — |
| Zinc 1-naphthoate | 1% | 49.37 | 23.9% |
| | 2% | 50.38 | 26.4% |
| Calcium 1-naphthoate | 1% | 46.44 | 16.6% |
| | 2% | 44.31 | 11.2% |
| Magnesium 1-naphthoate | 1% | 44.05 | 10.6% |
| | 2% | 45.84 | 15.1% |
| Zinc 1-naphthalene Acetate | 1% | 43.83 | 10.0% |
| | 2% | 50.88 | 27.7% |
| Calcium 1-naphthalene Acetate | 1% | 47.59 | 19.4% |
| | 2% | 45.64 | 14.5% |
| Magnesium 1-naphthalene Acetate | 1% | 44.45 | 11.6% |
| | 2% | 45.25 | 13.6% |

As can be seen from Tables 5, 6, and 7 above, the metal-centered carboxylate salt additives impacted the mechanical properties of the HDPE to varying degrees. The zinc-centered carboxylate salt additives performed better than the calcium-centered carboxylate salt additives, with both performing better than the magnesium-centered carboxylate salt additives. As would be readily appreciated by one having ordinary skill in the art, however, the additives may be selected to achieve any desirable characteristic or mechanical property of the resulting polyethylene thermoplastic.

Example 4

The above examples show the effects of metal-centered carboxylate salt additives on high-density polyethylene. The additives according to the present invention may also suitably be employed with other thermoplastic polymers, particularly polyolefins such as polypropylene. Accordingly, a test was performed using zinc 1-naphthoate (or naphthoic), zinc 1-naphthalene acetate, magnesium 1-naphthoate (or naphthoic), magnesium 1-naphthalene acetate, calcium 1-naphthoate (or naphthoic), and calcium 1-naphthalene acetate to impart improved mechanical properties on polypropylene (PP). The loading amounts of these additives were again varied from about 1% to about 2%. A native polypropylene sample containing zero amount of additive was again used as a control sample.

TABLE 8

Effect of various metal-centered carboxylate additives on PP.

| Sample | Additive % | YS, MPa | % Change | TS, MPa | % Change |
|---|---|---|---|---|---|
| Control-PP | 0% | 38.96 | — | 38.96 | — |
| Zinc 1-naphthoate | 1% | 39.64 | 1.8% | 33.44 | −14.2% |
| | 2% | 39.30 | 0.9% | 31.03 | −20.4% |
| Calcium 1-naphthoate | 1% | 39.99 | 2.7% | 39.30 | 0.9% |
| | 2% | — | — | — | — |
| Magnesium 1-naphthoate | 1% | 36.20 | −7.1% | 35.16 | −9.7% |
| | 2% | 34.99 | −10.2% | 33.78 | −13.3% |
| Zinc 1-naphthalene Acetate | 1% | 41.37 | 6.2% | 34.47 | −11.5% |
| | 2% | 37.23 | −4.4% | 32.41 | −16.8% |
| Calcium 1-naphthalene Acetate | 1% | 37.58 | −3.5% | 37.58 | −3.5% |
| | 2% | 35.16 | −9.7% | 34.47 | −11.5% |
| Magnesium 1-naphthalene Acetate | 1% | 41.71 | 7.1% | 40.33 | 3.5% |
| | 2% | 41.37 | 6.2% | 39.64 | 1.8% |

TABLE 9

Effect of various metal-centered carboxylate additives on PP.

| Sample | Additive % | E, GPa | % Change | Elong, % | % Change |
|---|---|---|---|---|---|
| Control-PP | 0% | 0.584 | — | 12.5 | — |
| Zinc 1-naphthoate | 1% | 0.473 | −19.0% | 25.4 | 103.2% |
|  | 2% | 0.502 | −14.1% | 21.3 | 70.5% |
| Calcium 1-naphthoate | 1% | 0.476 | −18.5% | 15.0 | 19.7% |
|  | 2% | — | — | — | — |
| Magnesium 1-naphthoate | 1% | 0.448 | −23.3% | 16.8 | 34.7% |
|  | 2% | 0.450 | −23.0% | 16.3 | 30.0% |
| Zinc 1-naphthalene Acetate | 1% | 0.530 | −9.3% | 20.4 | 63.1% |
|  | 2% | 0.479 | −18.1% | 21.0 | 67.7% |
| Calcium 1-naphthalene Acetate | 1% | 0.514 | −12.1% | 14.5 | 16.1% |
|  | 2% | 0.466 | −20.3% | 15.5 | 23.7% |
| Magnesium 1-naphthalene Acetate | 1% | 0.533 | −8.7% | 14.4 | 15.4% |
|  | 2% | 0.540 | −7.5% | 15.6 | 24.4% |

TABLE 10

Effect of various metal-centered carboxylate additives on PP.

| Sample | Additive % | HDT, °C. | % Change |
|---|---|---|---|
| Control-PP | 0% | 69.46 | — |
| Zinc 1-naphthoate | 1% | 57.41 | −17.4% |
|  | 2% | 57.35 | −17.4% |
| Calcium 1-naphthoate | 1% | 76.23 | 9.7% |
|  | 2% | 70.31 | 1.2% |
| Magnesium 1-naphthoate | 1% | 63.20 | −9.8% |
|  | 2% | 63.96 | −8.8% |
| Zinc 1-naphthalene Acetate | 1% | 63.19 | −9.0% |
|  | 2% | 59.25 | −14.7% |
| Calcium 1-naphthalene Acetate | 1% | 67.65 | −2.6% |
|  | 2% | 63.30 | −8.9% |
| Magnesium 1-naphthalene Acetate | 1% | 69.77 | −0.5% |
|  | 2% | 71.94 | 2.6% |

As can be seen from Tables 8, 9, and 10 above, the metal-centered carboxylate salt additives impacted the mechanical properties of the PP to varying degrees. The zinc-centered carboxylate salt additives performed better than the calcium-centered carboxylate salt additives, with both performing better than the magnesium-centered carboxylate salt additives. As would be readily appreciated by one having ordinary skill in the art, however, the additives may be selected to achieve any desirable characteristic or mechanical property of the resulting polypropylene thermoplastic.

Example 5

Figure 1A:
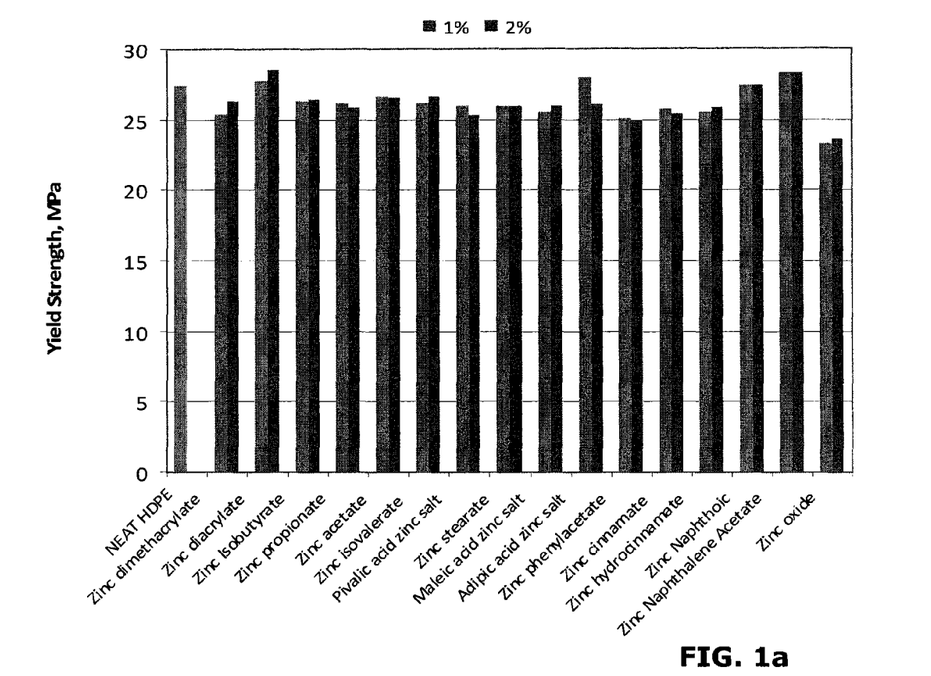
FIG. 1a is a chart comparing the Yield Strength (YS) results, measured in MPa, of the samples tested according to Example 2.
Figure 1B:
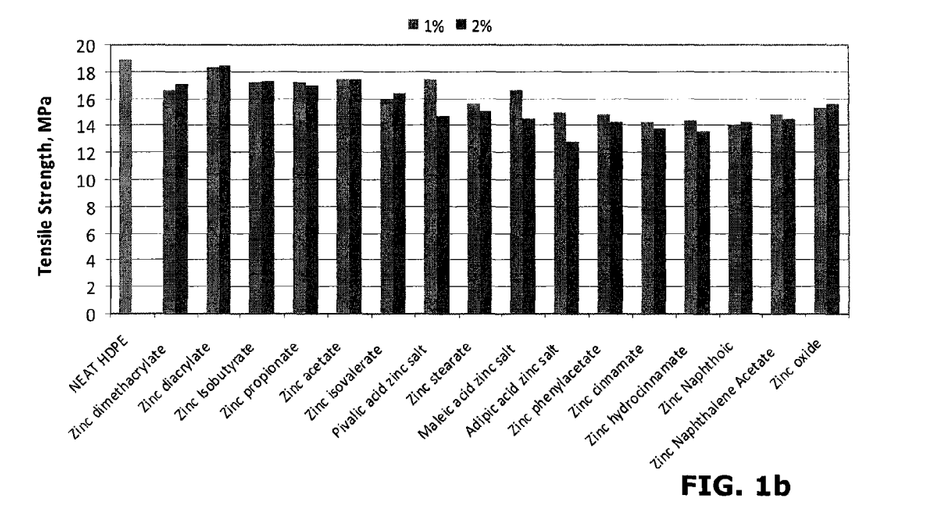
FIG. 1b is a chart comparing the Tensile Strength (TS) results, measured in MPa, of the samples tested according to Example 2.
Figure 1C:
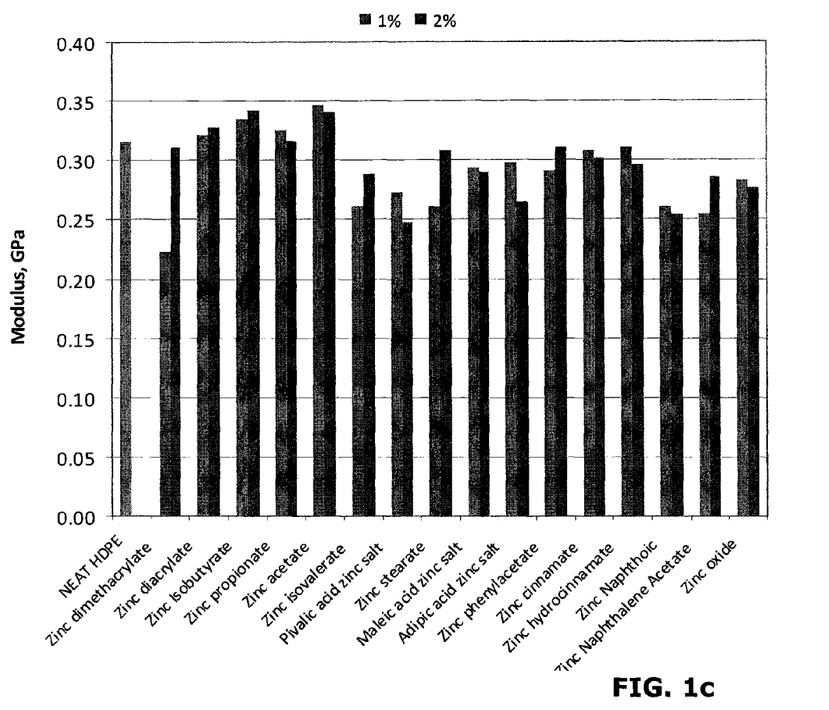
FIG. 1c is a chart comparing the elastic modulus (E) results, measured in GPa, of the samples tested according to Example 2.
Figure 1D:
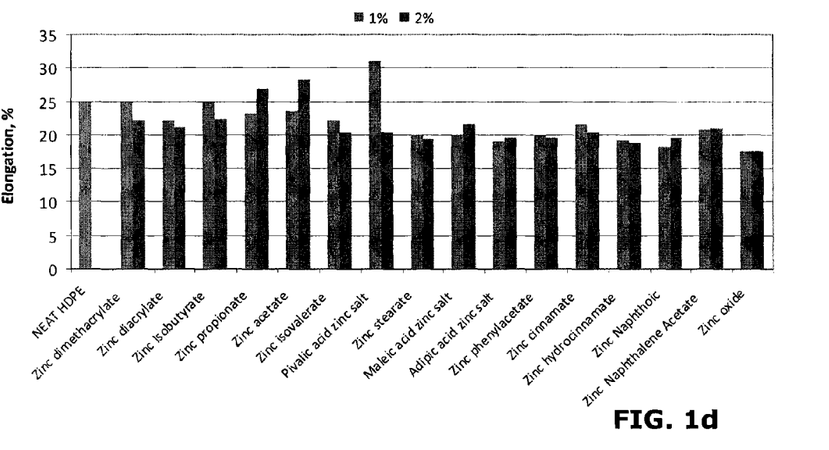
FIG. 1d is a chart comparing the elongation results, measured as a percentage (%), of the samples tested according to Example 2.
Figure 1E:
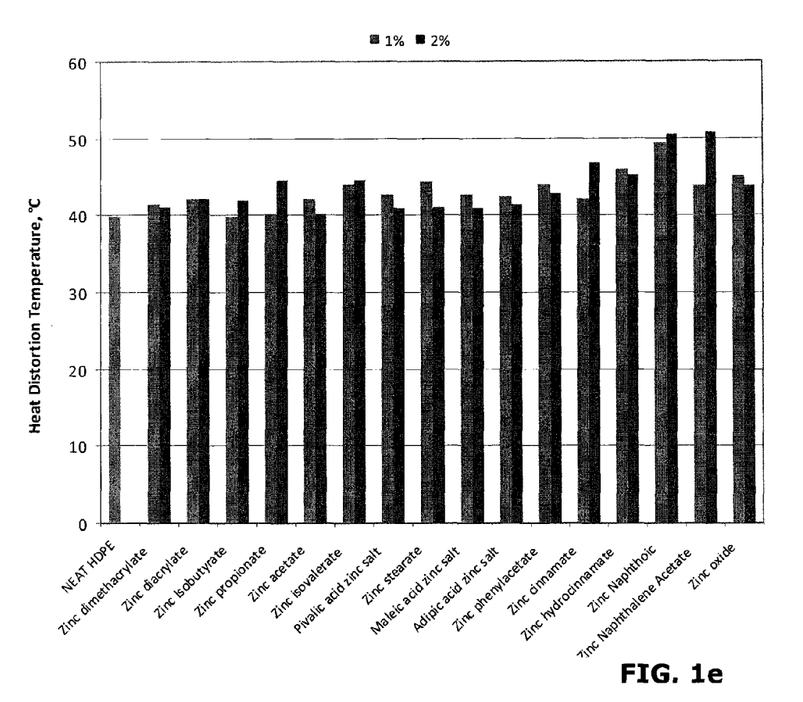
FIG. 1e is a chart comparing the heat distortion/deflection temperature (HDT) results, measured in degrees Celsius, of the samples tested according to Example 2.
Figure 1F:
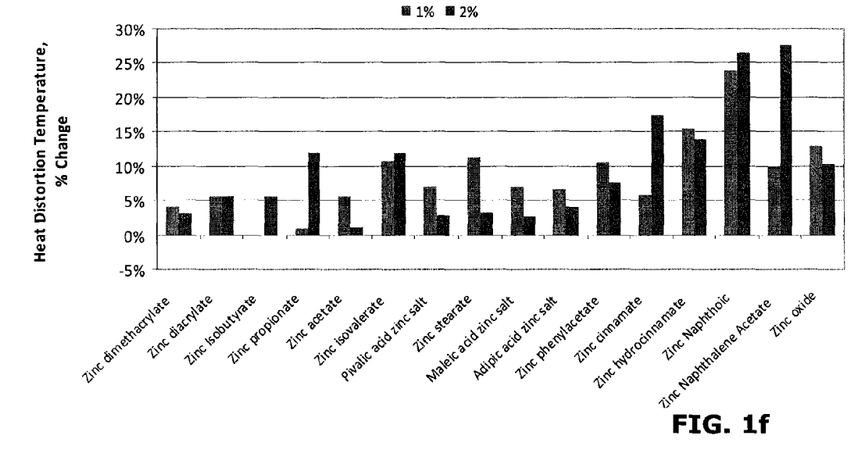
FIG. 1f is a chart showing the improvement in the heat distortion/deflection temperature (HDT) property, measured as a percentage change from the untreated thermoplastic, of the samples tested according to Example 2.
Figure 2A:
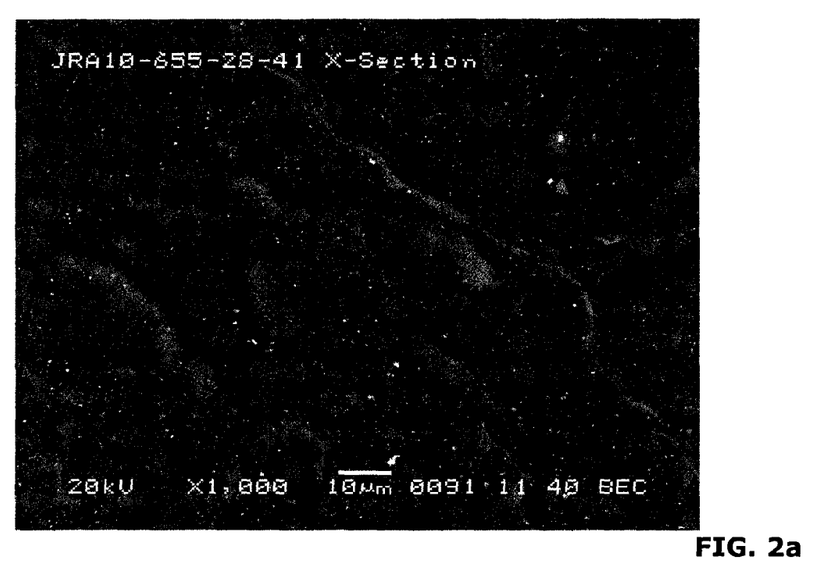
FIG. 2a is an image produced by Scanning Electron Microscopy (SEM) of a comparative thermoplastic sample treated with a dispersed zinc oxide additive.
Figure 2B:
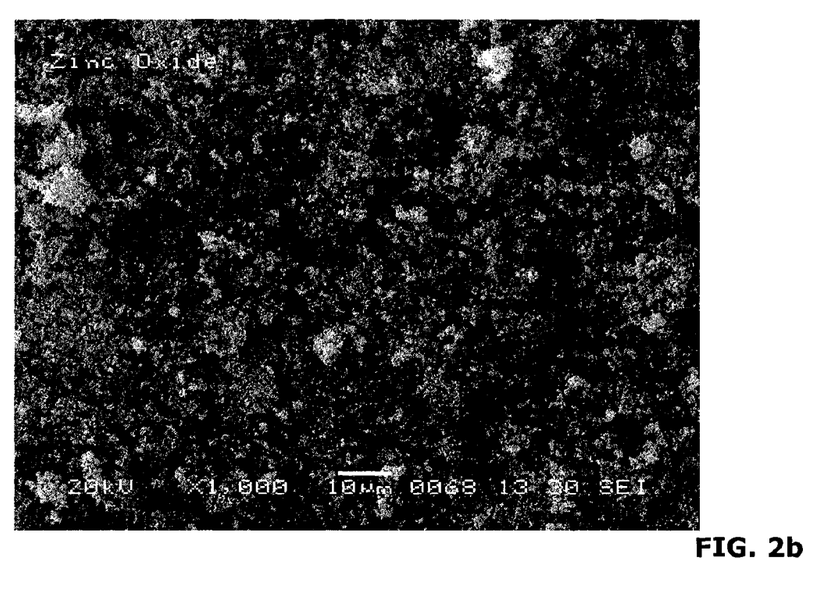
FIG. 2b is an image produced by Optical Microscopy of a comparative thermoplastic sample treated with a dispersed zinc oxide additive.
Figure 3A:
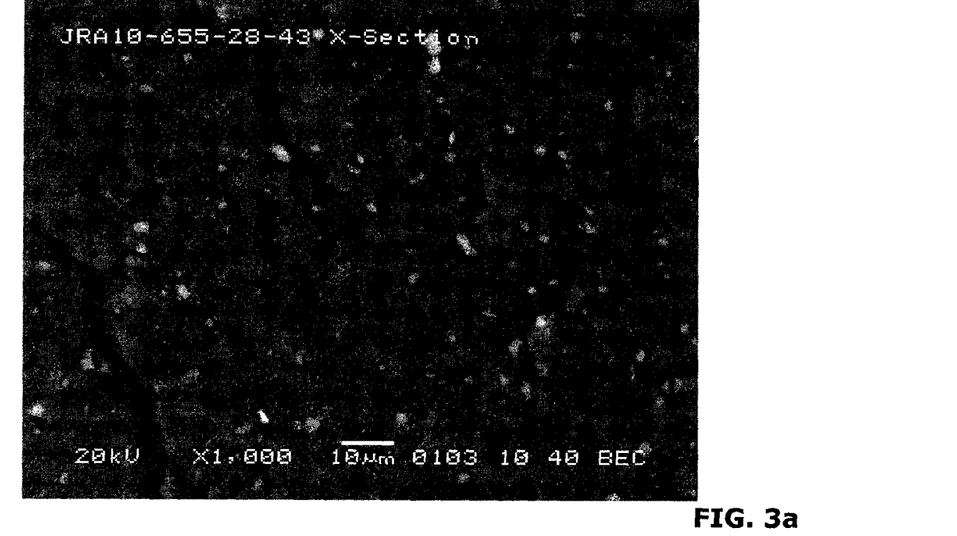
FIG. 3a is an image produced by Scanning Electron Microscopy (SEM) of a HDPE thermoplastic sample treated with a dispersed zinc naphthoate (or naphthoic) additive, in accordance with one embodiment of the present invention.
Figure 3B:
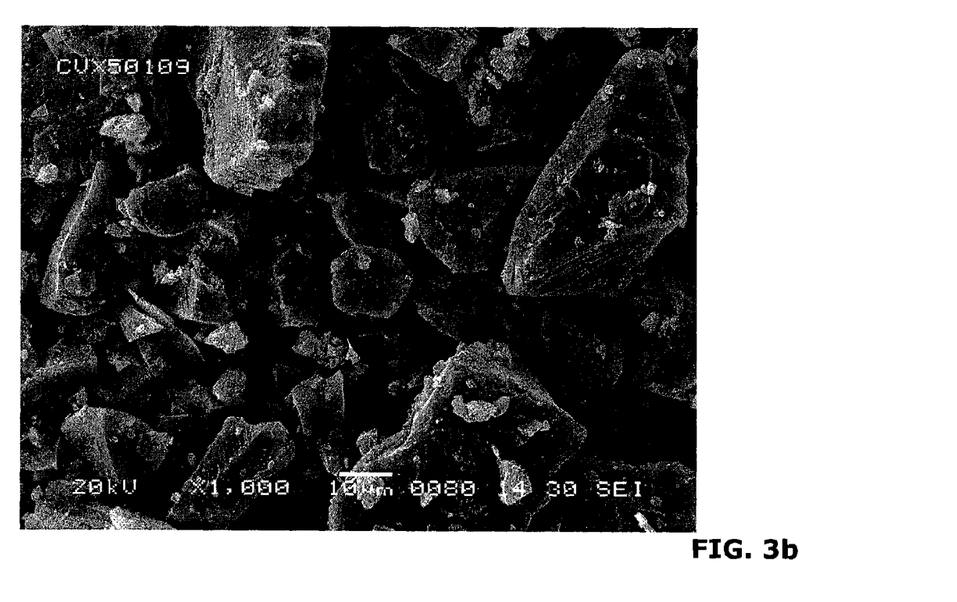
FIG. 3b is an image produced by Optical Microscopy of a HDPE thermoplastic sample treated with a dispersed zinc naphthoate (or naphthoic) additive, in accordance with one embodiment of the present invention.
Figure 4A:
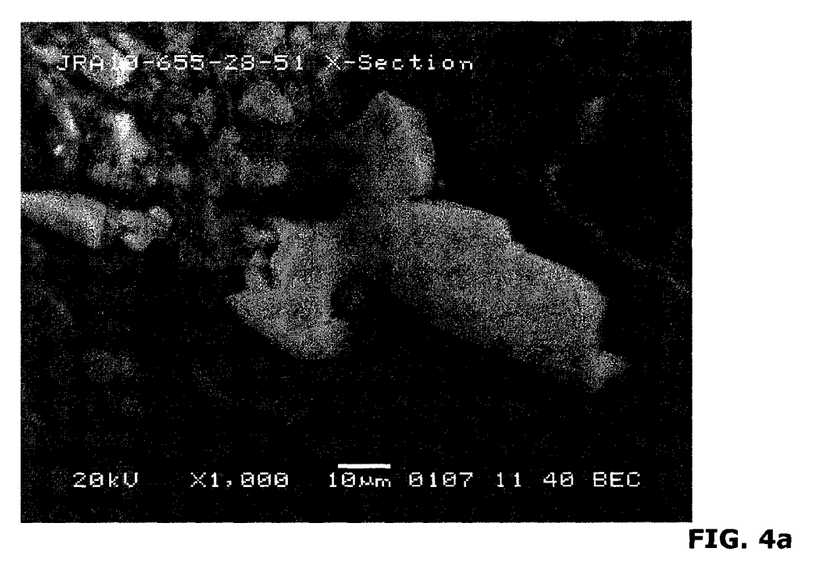
FIG. 4a is an image produced by Scanning Electron Microscopy (SEM) of a HDPE thermoplastic sample treated with a dispersed calcium naphthoate (or naphthoic) additive, in accordance with another embodiment of the present invention.
Figure 4B:
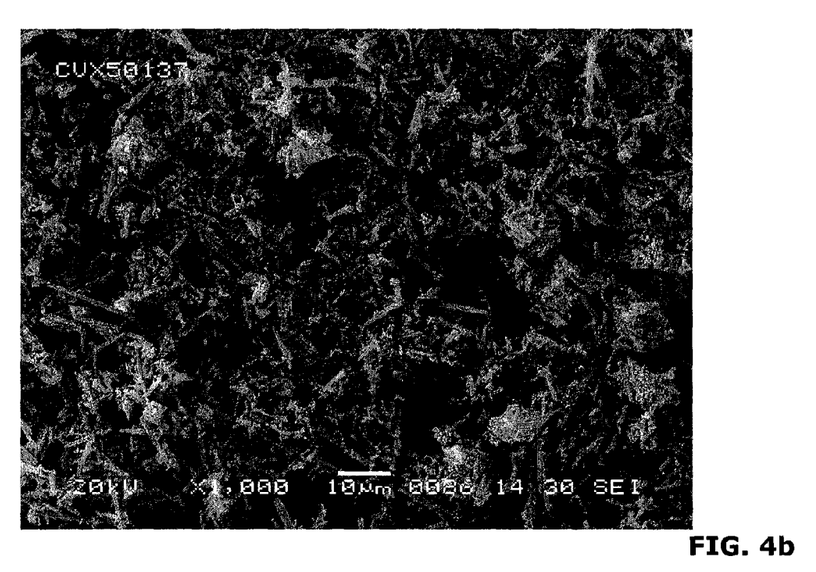
FIG. 4b is an image produced by Optical Microscopy of a HDPE thermoplastic sample treated with a dispersed zinc naphthoate (or naphthoic) additive, in accordance with another embodiment of the present invention.

The additives and improved thermoplastics according to the present invention were further analyzed using Scanning Electron Microscopy (SEM) and Optical Microscopy, the results of which are shown in FIGS. 2a, 2b, 3a, 3b, 4a, and 4b. FIGS. 2a and 2b show the microscopy results for a comparative HDPE sample treated with dispersed zinc oxide. FIGS. 3a and 3b shown the microscopy results for a HDPE sample treated with a dispersed zinc 1-naphthoate additive, in accordance with one or more embodiments of the present invention. FIGS. 4a and 4b shown the microscopy results for a HDPE sample treated with a dispersed calcium 1-naphthoate additive, in accordance with another embodiment of the present invention. As would be appreciated by one having ordinary skill in the art, the microscopy results of the HDPE samples treated with the additives of the present invention show characteristics indicative of improved mechanical properties, when compared with the results of the samples treated with dispersed zinc oxide. Without being held to the theory, the favorable microscopy results for the thermoplastics treated with the additives of the present invention are thought to be related to the interactive ligand and the ionic association characteristics of the additives. Further, the homogeneous distribution of the additive in the polyolefin matrix indicates that the compatibility of the additives with the polyolefins is significantly improved with the organic ligands surrounding the zinc metal center compared to the inorganic zinc oxides. While zinc-centered carboxylate additives performed better than calcium-centered carboxylate additives, both were preferred over zinc oxide or the native HDPE. These results are indicative of the theory that such additives physically immobilize the polymer chains of the polyolefins, imparting improved mechanical properties to the resulting thermoplastics.

As described above, the additives of the present invention which contain one or more metal salts, such as metal carboxylates, impart improved mechanical properties to thermoplastics. For example, particular additives of the present invention impart improved mechanical properties, such as improved heat distortion temperature, modulus, and tensile strength, to thermoplastics such as polyolefins. An enhanced thermoplastic material containing the additive may be formulated to achieve improved mechanical properties compared to when the additive is not present. The enhanced thermoplastic material containing the additive, such as an enhanced polyolefin, may be utilized to manufacture various articles using a myriad of process technologies. The presence of such an additive in an enhanced thermoplastic material improves the mechanical properties of the thermoplastic while retaining certain desirable characteristics inherent to the native polyolefin, such as reprocessability.

While preferred embodiments of the invention have been shown and described herein, it will be understood that such embodiments are provided by way of example only. Numerous variations, changes, and substitutions will occur to those skilled in the art without departing from the spirit of the invention. The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention, and suitable equivalents as would be appreciated by one having ordinary skill in the art are included in all respects.

What is claimed is:

1. A thermoplastic composition comprising a thermoplastic polymer and one or more ionic compounds, the one or more ionic compounds comprising a central metal element and one or more carboxylic acid functional moieties,
  wherein the thermoplastic polymer is polyethylene, polypropylene, polybutene, ethylene-propylene rubber, polyisobutylene, a cyclopolyolefin, polyisoprene, a poly-alpha-olefin, or mixtures thereof,
  wherein the one or more ionic compounds are metal salts of aromatic ring-containing carboxylic acids having one, two, or three aromatic rings,
  wherein the one or more carboxylic acid functional moieties are selected from the group consisting of 1-naphthoic acid, 2-naphthoic acid, 9-anthracenecarboxylic acid, 3-phenanthrenecarboxylic acid, 4-phenanthrenecarboxylic acid, 9-phenanthrenecarboxylic acid, 1-napthalene acetic acid, 2-phenanthrenecarboxylic acid, cinnamic acid, hydrocinnamic acid, and phenylacetic acid, with either a substituted or unsubstituted aromatic ring, and mixtures thereof, wherein the composition contains from 1% to about 10% of the one or more ionic compounds by weight of the composition and at least 90% of the thermoplastic polymer by weight of the composition, and wherein the central metal element is zinc.

2. The thermoplastic composition of claim 1, wherein the composition contains from 1% to about 5% of the one or more ionic compounds by weight of the composition.

3. The thermoplastic composition of claim 1, wherein the one or more ionic compounds are selected from the group consisting of zinc phenylacetate, zinc cinnamate, zinc hydrocinnamate, zinc naphthoate, zinc naphthalene acetate, and mixtures thereof.

4. A polymeric article having improved mechanical properties comprising the thermoplastic composition of claim 1.

5. The polymeric article of claim 4, wherein the article is an extruded, injection molded, cast, or pressed thermoplastic article.

6. A method of improving the mechanical properties of thermoplastics, the method comprising adding, to a thermoplastic composition comprising a polymer, an additive comprising one or more ionic compounds comprising a central metal element and one or more carboxylic acid functional moieties, wherein the polymer is polyethylene, polypropylene, polybutene, ethylene-propylene rubber, polyisobutylene, a cyclopolyolefin, polyisoprene, a poly-alpha-olefin, or mixtures thereof, wherein the one or more carboxylic acid functional moieties are selected from the group consisting of 1-naphthoic acid, 2-naphthoic acid, 9-anthracenecarboxylic acid, 3-phenanthrenecarboxylic acid, 4-phenanthrenecarboxylic acid, 9-phenanthrenecarboxylic acid, 1-napthalene acetic acid, 2-phenanthrenecarboxylic acid, cinnamic acid, hydrocinnamic acid, and phenylacetic acid, with either a substituted or unsubstituted aromatic ring, and mixtures thereof, and wherein the one or more ionic compounds are aromatic ring-containing carboxylic acids having one, two, or three aromatic rings, wherein the thermoplastic composition following addition of the one or more ionic compounds contains from 1% to about 10% of the one or more ionic compounds by weight of the composition and at least 90% of the thermoplastic polymer by weight of the composition, and wherein the central metal element is zinc.

7. The method of claim 6, wherein the polymer is polyethylene (PE) or polypropylene (PP).

8. The method of claim 6, wherein the one or more ionic compounds are selected from the group consisting of zinc cinnamate, zinc hydrocinnamate, zinc naphthoate, zinc naphthalene acetate, and mixtures thereof.

9. The method of claim 6, wherein the additive is combined with the polymer at conditions suitable to form a polymer matrix in which the one or more ionic compounds is homogeneously distributed within the polymer matrix.

10. The thermoplastic composition of claim 1, wherein the thermoplastic polymer is polyethylene (PE) or polypropylene (PP).

11. A thermoplastic composition comprising a thermoplastic polymer and one or more ionic compounds, the one or more ionic compounds comprising a central metal element and one or more carboxylic acid functional moieties, wherein the thermoplastic polymer is polyethylene, polypropylene, polybutene, ethylene-propylene rubber, polyisobutylene, a cyclopolyolefin, polyisoprene, a poly-alpha-olefin, or mixtures thereof, wherein the one or more ionic compounds are metal salts of aromatic ring-containing carboxylic acids having one, two, or three aromatic rings, wherein the one or more carboxylic add functional moieties are selected from the group consisting of 1-naphthoic add, 2-naphthoic acid, 9-anthracenecarboxylic acid, 3-phenanthrenecarboxylic acid, 4-phenanthrenecarboxylic acid, 9-phenanthrenecarboxylic acid, 1-napthalene acetic acid, 2-phenanthrenecarboxylic acid, cinnamic acid, hydrocinnamic acid, and phenylacetic acid, with either a substituted or unsubstituted aromatic ring, and mixtures thereof, wherein the composition contains from 1% to about 5% of the one or more ionic compounds by weight of the composition, and wherein at least a portion of the polymer is immobilized by the one or more ionic compounds without cross-linking or nucleation by the one or more ionic compounds.

12. The thermoplastic composition of claim 11, wherein the one or more ionic compounds are selected from the group consisting of zinc phenylacetate, zinc cinnamate, zinc hydrocinnamate, zinc naphthoate, zinc naphthalene acetate, and their equivalents substituting calcium or magnesium instead of zinc as the central metal element, and mixtures thereof.

13. The thermoplastic composition of claim 11, wherein the central metal element is zinc.

14. The thermoplastic composition of claim 11, wherein the thermoplastic polymer is polyethylene (PE) or polypropylene (PP).

15. A polymeric article having proved mechanical properties comprising the thermoplastic composition of claim 11.

16. The polymeric article of claim 15, wherein the article is an extruded, injection molded, cast, or pressed thermoplastic article.

* * * * *